United States Patent [19]
Ciarletta

[11] Patent Number: 5,502,919
[45] Date of Patent: Apr. 2, 1996

[54] PEST CONTROL DEVICE

[75] Inventor: John A. Ciarletta, Kansas City, Mo.

[73] Assignee: Bayer Corporation, Pittsburgh, Pa.

[21] Appl. No.: 33,703

[22] Filed: Mar. 16, 1993

Related U.S. Application Data

[63] Continuation of Ser. No. 639,610, Jan. 10, 1991, abandoned.

[51] Int. Cl.⁶ ..................................................... A01M 1/20
[52] U.S. Cl. ............................................. 43/131; 43/132.1
[58] Field of Search ..................................... 43/132.1, 114, 43/136, 107, 131

[56] References Cited

U.S. PATENT DOCUMENTS

| | | | |
|---|---|---|---|
| 2,328,590 | 9/1943 | Weil | 43/131 |
| 3,304,646 | 2/1967 | Staley | 43/131 |
| 4,132,026 | 1/1979 | Dodds | 43/131 |
| 4,281,471 | 8/1981 | Jenkins et al. | 43/131 |
| 4,349,981 | 9/1982 | Sherman | 43/131 |
| 4,709,503 | 12/1987 | McQueen | 43/114 |
| 4,709,504 | 12/1987 | Andric | 43/114 |
| 4,876,823 | 10/1989 | Brunetti | 43/114 |
| 4,952,401 | 8/1990 | Hobbs | 43/131 |
| 4,970,822 | 11/1990 | Sherman | 43/131 |
| 5,027,548 | 7/1991 | Anderson | 43/131 |
| 5,042,194 | 8/1991 | Cohen | 43/131 |

Primary Examiner—P. Austin Bradley
Assistant Examiner—Jeanne M. Elpel
Attorney, Agent, or Firm—Joseph C. Gil; Lyndanne M. Whalen; Godfried R. Akorli

[57] ABSTRACT

A device composed of a housing assembly having a passage or channels which form a passage when the housing assembly is in its closed position. The inner surface of the passage is treated with an appropriate insecticide in powder, dust or slurry form which will adhere to the passage wall surface. The passage of the housing assembly has an outer diameter of at least about 0.6 cm. The passage is dark. In a preferred embodiment, the passageway is arcuate and the passage walls are scored or ridged.

1 Claim, 1 Drawing Sheet

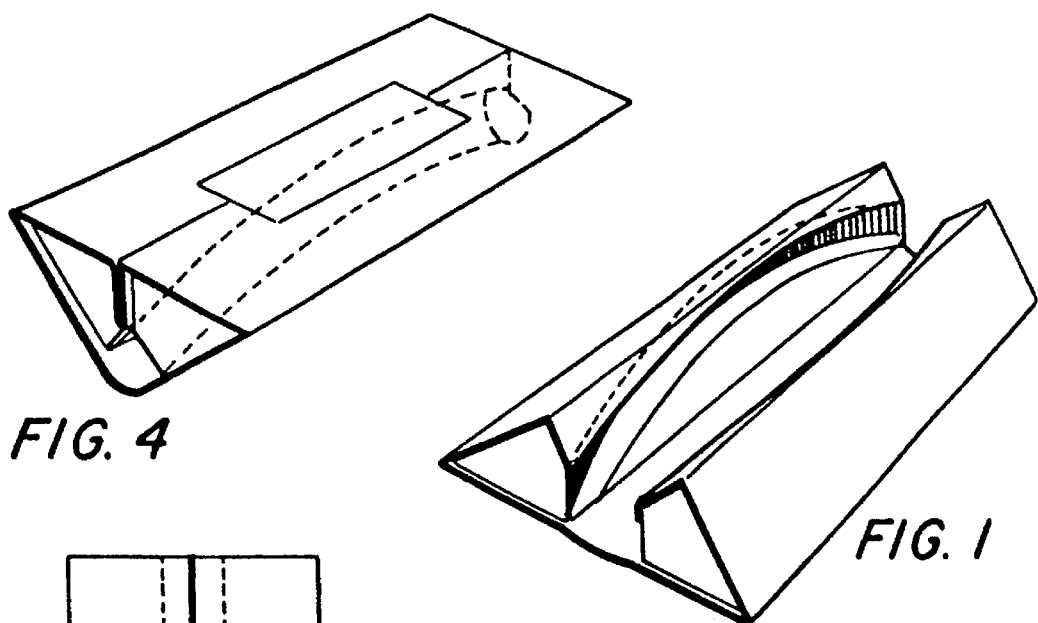
FIG. 4
FIG. 1
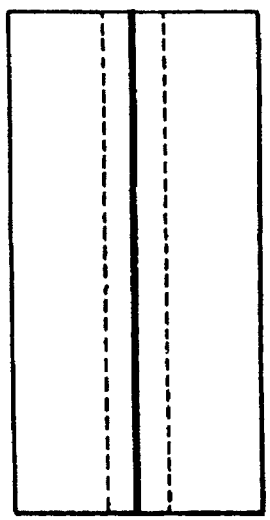
FIG. 5
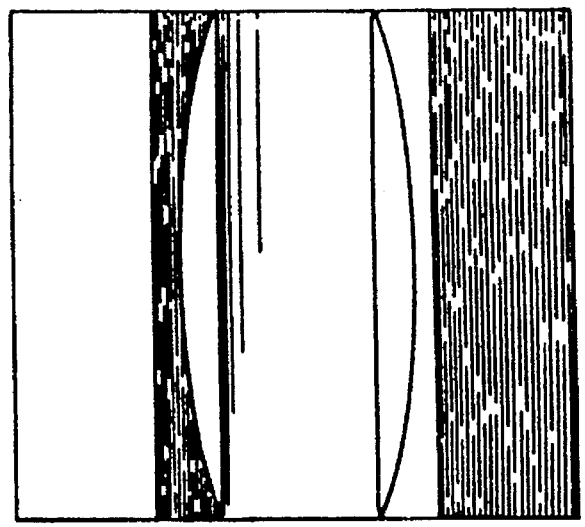
FIG. 2
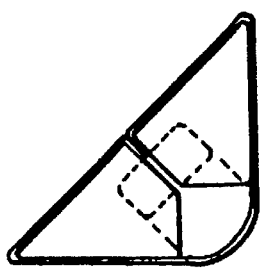
FIG. 6
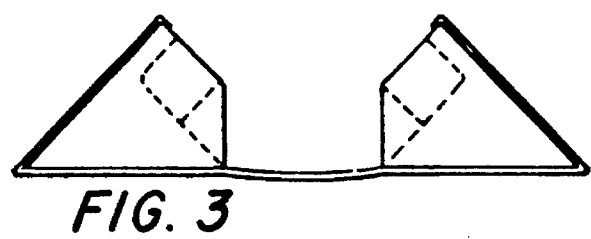
FIG. 3

PEST CONTROL DEVICE

This application is a continuation of application Ser. No. 07/639,610 filed Jan. 10, 1991, now abandoned.

BACKGROUND OF THE INVENTION

The present invention relates to a device for the control of pests such as insects, particularly cockroaches and to a method for controlling insect population using this device.

Chemicals for the control of pests are well known and commercially available. These chemicals must, however, generally come into direct contact with the pest to be eliminated in order to be effective. Achieving such contact presents a problem in environments where humans, particularly children, are likely to be present because effective pesticidal chemicals may also pose a health threat to humans. Efforts to achieve contact between pest and pesticide in environments such as homes have included the development of a number of different types of pesticide dispensing materials.

U.S. Pat. No. 4,160,335, for example, discloses dispensers for the controlled release of pest-controlling agents in which layers of materials containing active pest control and pest attractant substances are laminated to form sheets which may shaped into the desired form. Lamination is said to permit the prolonged, controlled release of the pest controlling substance. The forms in which these laminates are taught to be useful include wall paper, floor coverings, awnings, tarpaulins, upholstery, wall board, paneling, siding, countertops, ceiling tile, roofing materials, tapes or strips for tree branches and animal collars. Many of these disclosed forms are, however, too expensive to replace once the pesticide has lost its activity to be commercially feasible. The more practical strip applications are unsightly, ineffective against crawling pests such as cockroaches and present a potential health hazard to children.

U.S. Pat. Nos. 3,857,934 and 3,864,468 disclose activated polymer materials. In the materials disclosed in U.S. Pat. No. 3,857,934, the pest repelling agent is incorporated into a nonporous polymeric material which material is used in combination with another non-porous polymeric substrate. U.S. Pat. No. 3,864,468 discloses materials in which the pest repelling material is adherently applied to a polymeric substrate. These activated polymer materials are taught to be useful in the form of rigid or flexible sheets or films, in single or multiply products including laminates incorporating a rigid substrate or flexible scrim or other woven or non-woven reinforcing, backing or facing components.

No particular shape is recommended as being especially desirable in any of these disclosures. However, U.S. Pat. Nos. 4,031,653; 4,132,026 and 4,541,198 each disclose devices for controlling rodents in which a device having a specific configuration must be employed.

In the device disclosed in U.S. Pat. No. 4,031,653, the rodent enters the device via a gate member which regulates the path of the rodent such that once the rodent enters the bait device it is forced to proceed to the poisonous bait centrally located within the device and to exit via the same gate through which it entered. The bait must be inserted into the device prior to use.

The device described in U.S. Pat. No. 4,132,026 is a horizontally elongated tubular member of rectangular cross section in which the poisonous material must be inserted by the user prior to installation.

U.S. Pat. No. 4,541,198 discloses a tamper-proof rodent bait station in which internal baffles, a sloped floor and a locking feature are used to guide the rodent to the poisonous bait and to prevent access to the poisonous bait from the exterior of the bait station.

None of these disclosures, however, teaches or suggests a ready-to-use device for controlling pests such as cockroaches. Further, baits present inherent problems in that sufficient pesticide must be ingested and that time for ingestion of a lethal dose is necessary.

It would therefore be advantageous to have a pest controlling device which could be used without the need for inserting pesticide and which was faster acting than the known bait devices.

SUMMARY OF THE INVENTION

It is an object of the present invention to provide a device which effectively controls pests, particularly insects such as cockroaches.

It is another object of the present invention to provide a ready-to-use device for controlling pests which may be placed in the home environment without creating increased risk to children and pets.

It is also an object of the present invention to provide an effective method for controlling insects, particularly cockroaches.

These and other objects which will be apparent to those skilled in the art are accomplished by a device composed of a housing assembly having a passage or channels which form a passage when the housing assembly is in its closed position. The inner surface of the passage is treated with an appropriate insecticide in powder, dust or slurry form which will adhere to the passage wall surface. The passage of the housing assembly has an outer diameter of at least about 0.6 cm. The passage is dark. In a preferred embodiment, the passageway is arcuate and the passage walls are scored or ridged.

BRIEF DESCRIPTION OF THE DRAWINGS

FIG. 1 illustrates a one piece pest control device within the scope of the present invention which device is in the open position.

FIG. 2 illustrates the top view of the open device shown in FIG. 1.

FIG. 3 is a side view of the device shown in FIG. 1.

FIG. 4 shows a top view of the pest control device of FIG. 1 in the closed position.

FIG. 5 shows a bottom view of the pest control device of FIG. 1 in the closed position.

FIG. 6 shows a side view of the pest control device of FIG. 1 in the closed position.

DETAILED DESCRIPTION OF THE PREFERRED EMBODIMENTS OF THE PRESENT INVENTION

The present invention relates to a pest control device which is effective in controlling insects, particularly cockroaches and to a method for controlling pests in which this device is employed.

The device of the present invention is characterized by a housing containing a passageway when it is in the closed position. This device is typically formed from a one-piece, multi-sectioned molded unit such as that illustrated in FIG.

1 having channels present therein. The passageway will generally be formed by the channels when the sections of the molded unit are assembled or closed. The inner wall of the passageway must be such that an insecticide will adhere to that surface. This adherence may be accomplished by selection of the material from which the molded unit is made or by use of the desired insecticide in a form which will adhere to the passage wall. Another way to accomplish the desired adherence or to enhance adherence is to score the passage wall or make the passage wall ridged.

The path of the passageway of the device of the present invention may be straight, arcuate or angled. It is preferred that the passage be arcuate because the arc promotes darkness and creates a darker and more secure area for the insect. The cross-section of the passageway may be of any shape but it is preferred that this cross-section be circular.

The diameter of the passage must be large enough to accommodate the insect which is to be controlled or the largest of the insects to be controlled. In the case of cockroaches, for example, the diameter of the passage should generally be at least about 0.6 cm, preferably between about 0.5 and 1.0 cm. Smaller diameters would, of course, be appropriate for smaller insects.

The passage in the device of the present Invention should be relatively dark. Darkness may be achieved by several techniques. Appropriate techniques for achieving adequate darkness include use of dark colored materials to form the molded unit from which the device Is formed; use of dark colored materials to form the channels in the unit from which the device is formed; and recessing of the passage from the entrances. If the passageway is recessed, it is preferably recessed about 1.25 cm from each end.

The device of the present invention may be made of any suitable material. However, economic considerations make plastics such as polyvinyl chloride the preferred materials. It is also possible to form the unit from more than one material but this option is generally economically undesirable. This unit may be formed by any appropriate technique known to those skilled in the art. Molding is the preferred technique because of its simplicity, reproducibility and low cost.

Preferred materials from which the device of the present invention is formed include: polyvinyl chloride, rubber, metal, glass, paper, paraffin and mylar.

Any of the known insecticides which effectively controls insects which have come into contact with that insecticide may be used in the device of the present invention. Mixtures of insecticides may also be used, particularly where it is anticipated that more than one type of insect will enter the device of the present invention. Specific examples of suitable insecticides useful in the device of the present invention include: cyfluthrin, isofenphos, chlorpyrifos, propoxvr, diazinon, cypermethrtn, bendtocarb and propetamphos. These insecticides may be used in any form which makes it possible for them to adhere to the passage wall. Generally, the insecticide may be used in powder, dust or slurry form. The amount of insecticide incorporated into the device of the present invention will be dependent upon the specific insecticide being used. It has been found, however, that less insecticide is necessary in the device of the present invention than is generally used in known and available bait-type devices. However, it has been found that quantities of from about 0.002 mg AI (active ingredient) to about 500 mg are generally suitable with quantities of from about 50 mg AI to about 200 mg AI being preferred. The insecticide is applied to the surface of the inner wall of the passage in a manner such that the insecticide adheres to that surface.

The shape and size of the housing of the passage-containing unit is not critical to the present invention. In fact, considerations of the specific use, cosmetic design and practicality will determine the preferred shape and size of the desired device in any specific situation. It is generally preferred that at least one side of the assembled housing be flat. It is also frequently advantageous that this flat side of the housing have present thereon an adhesive material which makes it possible to mount the insect controlling device onto another flat surface. However, the housing may be any shape and/or size which it makes it possible to place the insect controlling device in inconspicuous locations. Consequently, the size of the housing is generally limited to the smallest size possible for a passageway having the desired diameter. Similarly, the shape of the housing is preferably such that it will fit in a corner, under an edge (e.g., under a countertop) or in any other unobtrusive location. Triangular housings are particularly well suited to fit in most locations.

The most preferred embodiment of the present invention is illustrated in FIGS. 1–6. This device is formed from a single piece of black molded polyvinyl chloride having two triangular sections which are mirror images of each other. Each section has a channel which is arcuate. The surface of the inner channel wall is ridged. As illustrated in FIG. 1, the molded unit from which the insect controlling device of the present invention is formed is 3¼ inches (approximately 8.25 cm) long and 1½ inches (approximately 3.8 cm) wide. The assembled housing shown in FIG. 3 is 0.75 inches (approximately i.g cm) high and the diameter of the passageway is ¼ inch (approximately 0.6 cm). As can be seen from FIG. 3, this device has a fiat surface to which adhesive may be applied for purposes of mounting the device in an inconspicuous location. It is also seen from FIG. 1 that the passageway is slightly recessed from the openings through which the insect enters the device.

It is also possible to include an attractant in the device of the present invention but such an attractant is not necessary. Suitable attractants will, of course, depend upon the type of insect to be targeted with the device of the present invention. Appropriate attractants will be obvious to those skilled in the art.

Having thus described my invention, the following examples are given as being illustrative thereof. All parts and percentages reported in these examples are parts by weight or percentages by weight, unless otherwise indicated.

EXAMPLES

Example 1

Cyfluthrin in varying concentrations was applied to a device corresponding to that illustrated in FIGS. 1–3 and described more fully above. The specific formulations applied to this device are given in Table 1. The percent control of cockroaches achieved with these devices is reported in Table 2. Percent control was calculated by the following formula:

$$\text{Percent effectiveness (control)} = \frac{C-T}{C} \times 100$$

$$= \frac{\text{percent living in the check} - \text{percent living in the treatment}}{\text{percent living in the check}} \times 100$$

TABLE 1

Roach Tunnel Treatments

| Sample | % AI of Cyfluthrin | Other Ingredients |
|---|---|---|
| A | 1.0 | 89% Glucam P-20 (an alkoxylated glucose derivative available from Amerchol Corp.), 10% isopropyl alcohol |
| B | 1.0 | 75% Glucam P-20 glucose derivative, 4% Soltrol 130 solvent (a naphtha available from Phillips Petroleum), 20% Arcoprime paraffinic base |
| C | 1.0 | 49% Glucam P-20 glucose derivative, 50% M-Pirol |
| D | 2.0 | 98% Paraffin |
| E | 10.0 | 90% Paraffin |
| F | 2.5 | 12.5% TEMPO 20 insecticide (20% cyfluthrin), 87.5% deionized water |
| G | 2.5 | 10% TEMPO 2C insecticide (__% cyfluthrin), 90% deionized-water |
| H | 10.0 | 40% TEMPO 2C insecticide (__% cyfluthrin), 60% deionized water |
| I | 10.0 | 23.3% Polytrap 603 (polymer entrapment system available from Agri Seuse, Inc.) |
| J | 20.0 | 80% Paraffin |
| K | 10.0 | 23.3% Polytrap 603 polymer entrapment system, 66.7% paraffin |
| L | 10.0 | 65% Glucam P-20 glucose derivative, 25% stearic acid |
| M | 20.0 | 55% Glucam P-20 glucose derivative, 25% stearic acid |
| N | 1.0 | 99% Killmaster insecticide base |
| O | 10.0 | 90% Killmaster insecticide base |
| P | 20.0 | TEMPO 20 insecticide Applied dry |
| Q | 12.0 | TEMPO 20 insecticide Aqueous slurry |
| R | — | — |
| S | — | — |

TABLE 2

German Cockroach Control Resulting from Roach Tunnels Treated with Formulations of Cyfluthrin

| Sample (% AI Cyfluthrin) | Test | PVC | Scarified PVC | Paper | Shell (Black) | Paraffin/Shell (Black) | Paraffin/Shell (Clear) | Alum. |
|---|---|---|---|---|---|---|---|---|
| A (1%) | 1[1] | 93% | 85% | 83% | | | | 90 |
|  | R[2] | 84 | 64 | 32 | | | | 90 |
| B (1%) | I | 67 | 90 | 67 | | | | 94 |
|  | R | 34 | 87 | 30 | | | | 86 |
| C (1%) | I | 93 | | | 92 | | | |
|  | R | 87 | | | 87 | | | |
| D (2%) | I | | | | | 52 | | |
|  | R | | | | | 62 | | |
| E (10%) | I | | | | | 73 | | |
|  | R | | | | | 68 | | |
| F (2.5%) | I | 87 | 87 | 80 | | | | |
|  | R | 83 | 84 | 93 | | | | |
| G (2.5%) | I | 76 | 78 | 80 | | | | |
|  | R | 69 | 75 | 42 | | | | |
| H (10%) | I | 90 | 93 | 86 | | | | |
|  | R | 94 | 97 | 69 | | | | |
| I (10%)[5] | I | 82 | 95 | 95 | | | | |
|  | R | 43 | 92 | 85 | | | | |
| J (20%) | I | | | | | 73 | 46 | |
|  | R | | | | | 84 | 85 | |
| K (10%) | I | | | | | 57 | 61 | |
|  | R | | | | | 69 | 53 | |
| L (10%) | I | | | | 98 | | | |
|  | R | | | | 98 | | | |
| M (20%) | I | | | | 100 | | | |
|  | R | | | | 96 | | | |
| N (1%) | I | | | | 0 | 0 | 0 | |
|  | R[3] | | | | 0 | | | |
| O (10%) | I | | | | 5 | | | |
|  | R[3] | | | | 13 | | | |
| P | I | 97 | 95 | 95 | | | | |
|  | R | 92 | 91 | 90 | | | | |
| Q | I | | | | 100 | | | |
|  | R | | | | 95 | | | |
| R | I | 95 | | | | | | |
|  | R | 90 | | | | | | |
| S | I | 28 | | | | | | |
|  | R | 9 | | | | | | |
| Untreated Control | | 0 | 0 | 0 | 0 | 0 | 0 | 0 |

[1] Initial evaluation
[2] Reruns
[3] 48-hours results

Example 2

Formulations of 1% and 10% solution of cyfluthrin in different solvent systems which are described in Table three were tested in a device corresponding to that Illustrated in FIGS. 1–3 and described more fully above, white rubber tubing, clear rubber tubing and a white drinking straw to determine whether the device of the present invention would be more effective than other tubular devices and to determine whether the length of the insect control device had any effect upon the effectiveness of the device. The results of these comparisons are given in Table 3. It is evident from the data in Table 3, that the length of the tube did influence the effectiveness of the device because the percents control achieved with tubes of three inches were generally higher than the those achieved with the two inch tubes. The percent control achieved with black device was also generally higher than that for the white and clear tubes.

insect control device corresponding in structure to that illustrated in FIGS. 1–3 and described more fully above. These devices as well as a control device were evaluated for their effectiveness in controlling cockroaches by placing them into a standard choice box trial treatments were placed in identical positions in the 1 ft.sq. choice box, in addition to food, water and harborage areas. The results are presented in Table 4.

TABLE 3

Performance on German Cockroach[A]

| Solvent System | Percent Cyfluthrin | Black[B] | White[C] | Clear[C] | Straw[D] (White) | Ave. |
|---|---|---|---|---|---|---|
| | | I) Percent Control from 2" Tubes | | | | |
| Isopropanol | 1% | 71% | 66% | 90% | 95% | 81% |
| 1,1,1,T | 10 | 83 | 53 | 79 | 84 | 75 |
| Acetone | 10 | 90 | 64 | 90 | 78 | 86 |
| Average | | 82 | 61 | 86 | 87 | 79 |
| Untreated Control | | 0 | 0 | 0 | 0 | 0 |
| | | II) Percent Control from 3" Tubes | | | | |
| Isopropanol | 1% | 58% | 97% | 82% | 95% | 83% |
| 1,1,1,T | 10 | 87 | 51 | 90 | 35 | 66 |
| Acetone | 10 | 97 | 43 | 97 | 82 | 80 |
| Average[F] | — | 81 | 64 | 90 | 71 | 76 |
| Wettable Powder[E] | 20 | 91 | — | — | — | 91 |
| Treated Control | | 0 | 0 | 0 | 0 | 0 |

[A]Performance after 24 hours
[B]Rubber tubing
[C]Plastic tubing
[D]Drinking straw
[E]TEMPO 20WP
[F]Averages exclude wettable powder

Example 3

A slurry of Tempo 20 insecticide (cyfluthrin) at 12.5% concentration and a slurry of Dursban 1 ME insecticide (phosphorothioic acid 0,0-diethyl 0-(3,5,6-trtchloro-2-pyridinyl) ester) at 12% concentration were each applied to an

TABLE 4

Comparative Performance on German Cockroach from TEMPO 20 and Dursban 1 ME Evaluated as Roach Tunnel* Treatments in Standard Choice Box Evaluations

| Treatment[1] | Percent Concentration | Percent Control | | | | | | |
|---|---|---|---|---|---|---|---|---|
| | | TEST 1 | TEST 2 | TEST 3 | TEST 4 | TEST 5 | TEST 6 | Average |
| TEMPO 20 insecticide plus Sticker[2] | 12.5 | 100% | 89% | 92 | 100 | 100 | 100 | 97 |
| Dursban 1 ME | 12.0 | 75 | 84 | 50 | 94 | 50 | 87 | 73 |
| Untreated Control | | 0 | 0 | 0 | 0 | 0 | 0 | 0 |

[1]Treatments applied to tunnels as slurry
[2]Sticker = Exhaust 800 @ 2 pts/100 gal.
*Rippled passageway.

Example 4

Sample J was a paraffin solid block with 2% cyfluthrtn incorporated in the paraffin. TEMPO 20 was applied as a 12% slurry from Example 1 and of Tempo 20 WP (cyfluthrtn) insecticide at a concentration of 2 and 12.0% respectively were each applied to devices corresponding in structure to that illustrated in FIGS. 1–3 as a 12% aqueous solution. The results are summarized in Table 5.

TABLE 5

German Cockroach Control from Cyfluthrin Treated Roach Tunnels Evaluated in an Expanded Choice Box Evaluations*

| Treatment[2] | I) Percent Daily Control[1] | | | | | | |
|---|---|---|---|---|---|---|---|
| | 1 Day | 2 Days | 3 Days | 4 Days | 5 Days | 6 Days | AVERAGE |
| Sample J | 41% | 33% | 35% | 20% | 22% | 6% | 26% |
| TEMPO 20 WP Insecticide | 91 | 90 | 75 | 81 | 82 | 33 | 76 |
| Untreated Control | 0 | 0 | 0 | 0 | 0 | 0 | |

[1]Based on total daily mortalities, where daily survivors remain in test in addition to 200 insects added daily. (Total 1200)

Example 5

An aqueous slurry of each of Tempo 20 WP (cyfluthrin), Tempo 1 HE (cyfluthrin) and FCR 4545 (cyfluthrin) at ]2% concentration was applied to an insect control device corresponding in structure to that illustrated in FIGS. 1–3. The results are summarized in Table 6.

TABLE 6

Performance on German Cockroach from Treatments Applied in The "Roach Tunnel

| Insecticide Treatment | Choice of Box Evaluation | |
|---|---|---|
| | Percent Conc.[1] | Percent Control |
| TEMPO 20 WP (6033057) | 12 | 92 |
| TEMPO 1 ME 88R0078S | 12 | 71 |
| FCR 4545 (125 EC) | 12 | 76 |
| Untreated Control | | 0 |

[1]Slurry application in roach tunnel.

Example 6

Commercially available bait stations were compared with an insect control device of the present invention corresponding in structure to that illustrated in FIGS. 1–3 with the passage treated with OFTANOL (isofenphos) applied as a dry powder. The results are summarized in Table 7.

Example 7

A formulation of 40% OFTANOL (isofenphos) and 8% captan was applied to an insect control device corresponding in structure to that illustrated in FIGS. 1–3 in the form of a dry powder. Corresponding devices were made with Tempo 20 (cyfluthrin) and captan 50 each in the form of a dry powder. The results are summarized in Table 8.

Although the invention has been described in detail in the foregoing for the purpose of illustration, it is to be understood that such detail is solely for that purpose and that variations can be made therein by those skilled in the art without departing From the spirit and scope of the invention except as it may be limited by the claims.

What is claimed is:

1. A roach control device which is a housing having a single arcuate passageway therethrough from which the roach may exit in which
    a) insecticide in powder, dust or slurry form is present on the inner wall of the passageway,
    b) the passageway has an outer diameter of about 0.6 cm or greater and
    c) the passageway walls are dark in color; in which the housing is formed by joining two sections of plastic material each section having present therein a channel having a rough surface positioned in a manner such that when the two sections are joined said passageway is formed.

* * * * *